United States Patent
Watanabe et al.

(10) Patent No.: US 9,316,297 B2
(45) Date of Patent: Apr. 19, 2016

(54) SCREW MOTION MECHANISM AND DAMPING APPARATUS USING SAME

(75) Inventors: Yoshihito Watanabe, Tokyo (JP); Hidenori Kida, Tokyo (JP); Shigeki Nakaminami, Tokyo (JP); Hisaya Tanaka, Tokyo (JP)

(73) Assignees: THK CO., LTD., Tokyo (JP); ASEISMIC DEVICES CO., LTD., Tokyo (JP)

( * ) Notice: Subject to any disclaimer, the term of this patent is extended or adjusted under 35 U.S.C. 154(b) by 316 days.

(21) Appl. No.: 13/989,954

(22) PCT Filed: Oct. 20, 2011

(86) PCT No.: PCT/JP2011/074144
§ 371 (c)(1),
(2), (4) Date: May 28, 2013

(87) PCT Pub. No.: WO2012/086303
PCT Pub. Date: Jun. 28, 2012

(65) Prior Publication Data
US 2013/0243517 A1    Sep. 19, 2013

(30) Foreign Application Priority Data

Dec. 20, 2010    (JP) .................................. 2010-282751

(51) Int. Cl.
*F16C 11/06*    (2006.01)
*F16H 25/12*    (2006.01)
(Continued)

(52) U.S. Cl.
CPC ................ *F16H 25/12* (2013.01); *F16C 11/06* (2013.01); *F16C 11/0614* (2013.01);
(Continued)

(58) Field of Classification Search
CPC ...... F16H 25/20; F16C 11/06; F16C 11/0647; F16F 2232/06

USPC .......................................... 74/89.23; 52/167.8
See application file for complete search history.

(56) References Cited

U.S. PATENT DOCUMENTS 1,146,723 A * 7/1915 Losh ...................... F16K 15/18
251/83
1,883,782 A * 10/1932 Graham ...................... 403/137
(Continued)

FOREIGN PATENT DOCUMENTS

JP    2001-200881 A    7/2001
JP    10-184757 A    7/2008
(Continued)

OTHER PUBLICATIONS

International Search Report for PCT/JP2011/074144, Mailing Date of Jan. 24, 2012.

*Primary Examiner* — William Kelleher
*Assistant Examiner* — Jude Agendia
(74) *Attorney, Agent, or Firm* — Westerman, Hattori, Daniels & Adrian, LLP (57) ABSTRACT

The screw motion mechanism includes: a threaded shaft having an outer peripheral surface provided with a helical thread groove, the threaded shaft having at least one axial end coupled to a first structural body; a nut member held in a rotatable manner with respect to a second structural body which is movable in an axial direction of the threaded shaft with respect to the first structural body, the nut member being threadedly engaged with the threaded shaft; and a spherical joint for coupling the at least one axial end of the threaded shaft to the first structural body, the spherical joint including: a spherical portion; and a sphere receiving portion for housing the spherical portion. When assuming an axial force applied to the threaded shaft as a variable, a line of a rotational torque intersects with a line of a sliding torque in a graph.

6 Claims, 4 Drawing Sheets

(51) Int. Cl.
  *F16H 9/12* (2006.01)
  *F16C 29/06* (2006.01)
  *F16F 9/12* (2006.01)
  *F16H 25/20* (2006.01)
  *F16H 57/04* (2010.01)

(52) U.S. Cl.
  CPC .............. *F16C 29/0688* (2013.01); *F16F 9/12* (2013.01); *F16H 25/2021* (2013.01); *F16F 2232/06* (2013.01); *F16H 57/045* (2013.01); *F16H 57/0497* (2013.01); *F16H 2025/2037* (2013.01); *Y10T 403/32065* (2015.01)

(56) References Cited

U.S. PATENT DOCUMENTS

| | | | | |
|---|---|---|---|---|
| 2,856,179 | A | * | 10/1958 | Hogan ............... B64C 25/60 188/129 |
| 2,918,786 | A | * | 12/1959 | Geyer ................ F15B 13/10 60/718 |
| 3,418,011 | A | * | 12/1968 | Scheublein, Jr. .... F16C 11/0647 403/125 |
| 3,606,704 | A | * | 9/1971 | Denton ....................... 52/167.8 |
| 6,230,450 | B1 | | 5/2001 | Kuroda et al. |
| 6,510,660 | B1 | | 1/2003 | Michioka et al. |
| 8,312,783 | B2 | * | 11/2012 | McKay ................ B64C 13/28 244/99.2 |
| 2009/0193916 | A1 | | 8/2009 | Watanabe et al. |

FOREIGN PATENT DOCUMENTS

| | | |
|---|---|---|
| JP | 10-184786 A | 7/2008 |
| JP | 2009-168095 A | 7/2009 |
| JP | 2010-261474 A | 11/2010 |

* cited by examiner

SCREW MOTION MECHANISM AND DAMPING APPARATUS USING SAME

TECHNICAL FIELD

The present invention relates to a screw motion mechanism, which includes a threaded shaft and a nut member threadedly engaged with the threaded shaft, and is configured to convert a translational motion into a rotational motion, or the rotational motion into the translational motion. The present invention also relates to a damping apparatus using the screw motion mechanism.

BACKGROUND ART

As an apparatus for converting a translational motion into a rotational motion, or the rotational motion into the translational motion, there has been known a screw motion mechanism including a threaded shaft provided with helical male threads and a nut member provided with female threads and threadedly engaged with the threaded shaft. In particular, a ball screw apparatus including balls interposed between the threaded shaft and the nut member is used for various purposes. For example, as disclosed in Patent Literature 1, there has been known a ball screw apparatus used, for example, in a damping apparatus for quickly diminishing vibration to be applied to building structures.

This damping apparatus is an apparatus provided as a brace between poles of building structures. Specifically, the damping apparatus includes a rod member coupled to one structural body, and a housing member provided to cover the rod member and fixed to another structural body. The rod member has an outer peripheral surface provided with a helical thread groove, and a nut member that is freely rotatable with respect to the housing member is threadedly engaged with the thread groove. In other words, the rod member corresponds to the threaded shaft of the ball screw apparatus. Further, a cylindrical rotor housed within the housing member is fixed in the nut member, and the rotor has an outer spherical surface facing an inner peripheral surface of the housing member so as to form a containing chamber for viscous fluid.

In the damping apparatus structured as described above, when the rod member advances and retracts in an axial direction with respect to the nut member along with vibration applied between the two structural bodies, the nut member converts an axial motion of the rod member into a rotational motion, and the rotor fixed in the nut member is also rotated along with the rotational motion of the nut member. A gap between the outer peripheral surface of the rotor and the inner peripheral surface of the housing member is formed as the containing chamber for the viscous fluid. Thus, when the rotor is rotated, a shear friction force in proportion to a rotational angular speed of the rotor is applied to the viscous fluid in the containing chamber. As a result, beat is generated in the viscous fluid. In other words, in this damping apparatus, vibrational energy between the structural bodies is converted into energy of a rotational motion, and further, energy of the rotational motion is converted into thermal energy. As a result, the vibrational energy transmitted between the structural bodies is damped.

The damping apparatus is used by fixing one end of the housing member and one end of a threaded shaft as the rod member respectively to separate structural bodies. In this case, in order to allow postural changes of the damping apparatus with respect to the structural bodies, the housing and the rod member are connected respectively to the structural bodies through intermediation of clevises. Those clevises each include a support shaft, and the housing member or the rod member is connected to the structural body while being provided with a degree of freedom to pivot about the support shaft. In this case, the support shaft functions as a rotation stopper for the threaded shaft. With this, a translational motion in the axial direction of the threaded shaft is converted into a rotational motion of the nut member.

CITATION LIST

Patent Literature

[PTL 1] JP 10-184757 A

DISCLOSURE OF THE INVENTION

Problems to be Solved by the Invention

However, the clevis only provides the degree of freedom to pivot about the support shaft to the housing member or the rod member, and hence the housing member or the rod member cannot be displaced in an axial direction of the support shaft. As a result, there arises a problem in that time and effort are required for adjustment of fixing positions of the clevises with respect to the structural bodies at the time of installing the damping apparatus to the structural bodies.

Further, in the damping apparatus using the screw motion mechanism as described above, the axial motion of the rod member along with the vibration applied to the structural bodies is converted. into rotational motions of the nut member and the rotor. When vibration due to unexpectedly excessive acceleration is applied, rotational directions of the rotor are changed while the rotor maintains a high angular momentum. As a result, an excessive torque is applied to the nut member and the threaded shaft which constitute the screw motion mechanism, and those members may be damaged.

Means for Solving the Problems

The present invention has been made in view of the problems described above. It is an object of the present invention to provide a screw motion mechanism and a damping apparatus using the screw motion mechanism. The screw motion mechanism is capable of facilitating connection of an axial end of a threaded shaft with respect to a structural body while preventing a rotation of the threaded shaft, and capable of preventing application of an excessive torque to a nut member and the threaded shaft and preventing damage on those members.

In order to attain the object described above, according to the present invention, there is provided a screw motion mechanism, including: a threaded shaft having an outer peripheral surface provided with a helical thread groove, the threaded shaft having at least one axial end coupled to a first structural body; a nut member held in a rotatable manner with respect to a second structural body which is movable in an axial direction of the threaded shaft with respect to the first structural body, the nut member being threadedly engaged with the threaded shaft; and a spherical joint for coupling the at least one axial end of the threaded shaft to the first structural body, the spherical joint including: a spherical portion; and a sphere receiving portion for housing the spherical portion, in which a rotational torque transmitted between the nut member and the threaded shaft varies in accordance with an axial force applied to the threaded shaft, and in which a sliding torque transmitted between the spherical portion of the spherical joint and the sphere receiving portion of the spherical joint also varies in accordance with the axial force applied to the threaded shaft. Further, when assuming the axial force of the threaded shaft as a variable, a line of the rotational torque intersects with a line of the sliding torque in a graph, and the sliding torque exceeds the rotational torque under an initial state in which the axial force is not applied to the threaded shaft.

According to the present invention, there is provided a damping apparatus, including: a threaded shaft having an outer peripheral surface provided with a helical thread groove, the threaded shaft having at least one axial end coupled to a first structural body; a nut member held in a rotatable manner with respect to a second structural body and threadedly engaged with the threaded shaft, the nut member being configured to perform a reciprocating rotation along with vibration of the second structural body with respect to the first structural body; damping means coupled to the nut member, for damping the reciprocating rotation of the nut member; and a spherical joint for coupling the at least one axial end of the threaded shaft to the first structural body, the spherical joint including: a spherical portion; and a sphere receiving portion for housing the spherical portion, in which a rotational torque transmitted between the nut member and the threaded shaft varies in accordance with an axial force applied to the threaded shaft, and in which a sliding torque transmitted between the spherical portion of the spherical joint and the sphere receiving portion of the spherical joint also varies in accordance with the axial force applied to the threaded shaft. Further, when assuming the axial force of the threaded shaft as a variable, a line of the rotational torque intersects with a line of the sliding torque in a graph, and the sliding torque exceeds the rotational torque under an initial state in which the axial force is not applied to the threaded shaft.

Effects of the Invention

According to the screw motion mechanism of the present invention, the spherical joint is provided at the at least one axial end of the threaded shaft. With this, irrespective of a posture of the threaded shaft, the at least one axial end of the threaded shaft can be easily connected to the first structural body.

When the threaded shaft and the nut member are subjected to translational motions relative to each other in the axial direction, and the translational motion is converted into a rotational motion of the nut member, the rotational torque transmitted between the nut member and the threaded shaft tends to be higher in proportion to an axial external force applied to the threaded shaft (hereinafter referred to as "axial force"). Further, the sliding torque transmitted between the spherical portion of the spherical joint and the sphere receiving portion of the spherical joint also tends to be higher in proportion to the axial force applied to the threaded shaft. When the at least one axial end of the threaded shaft is connected to the structural body through intermediation of a spherical bearing, the threaded shaft is not rotated when the rotational torque is lower than the sliding torque in the spherical joint. Thus, the relative translational motions of the threaded shaft and the nut member can be converted into the rotational motion of the nut member. Meanwhile, when the rotational torque is higher than the sliding torque in the spherical joint, the spherical portion of the spherical joint slides with respect to the sphere receiving portion of the spherical joint. Thus, even when the relative translational motions of the threaded shaft and the nut member occur, the translational motions are not perfectly converted into the rotational motion of the nut member. Thus, at least a part of the translational motions is converted into a rotational motion of the threaded shaft, with the result that the rotational torque applied to the nut member is reduced.

In other words, when the sliding torque between the spherical portion of the spherical joint and the sphere receiving portion of the spherical joint provided at the at least one axial end of the threaded shaft is arbitrarily set, the spherical joint functions as a torque limiter on the rotational motion of the nut member. With this, even at the time of the conversion of the relative translational motions of the threaded shaft and the nut member into the rotational motion of the nut member, an excessive rotational. torque is not applied to the nut member or the threaded shaft, and damage on the nut member and the threaded shaft can be prevented.

MODE FOR CARRYING OUT THE INVENTION

In the following, with reference to the attached drawings, detailed description is made of a screw motion mechanism of the present invention and a damping apparatus using the screw motion mechanism.

Figure 1:
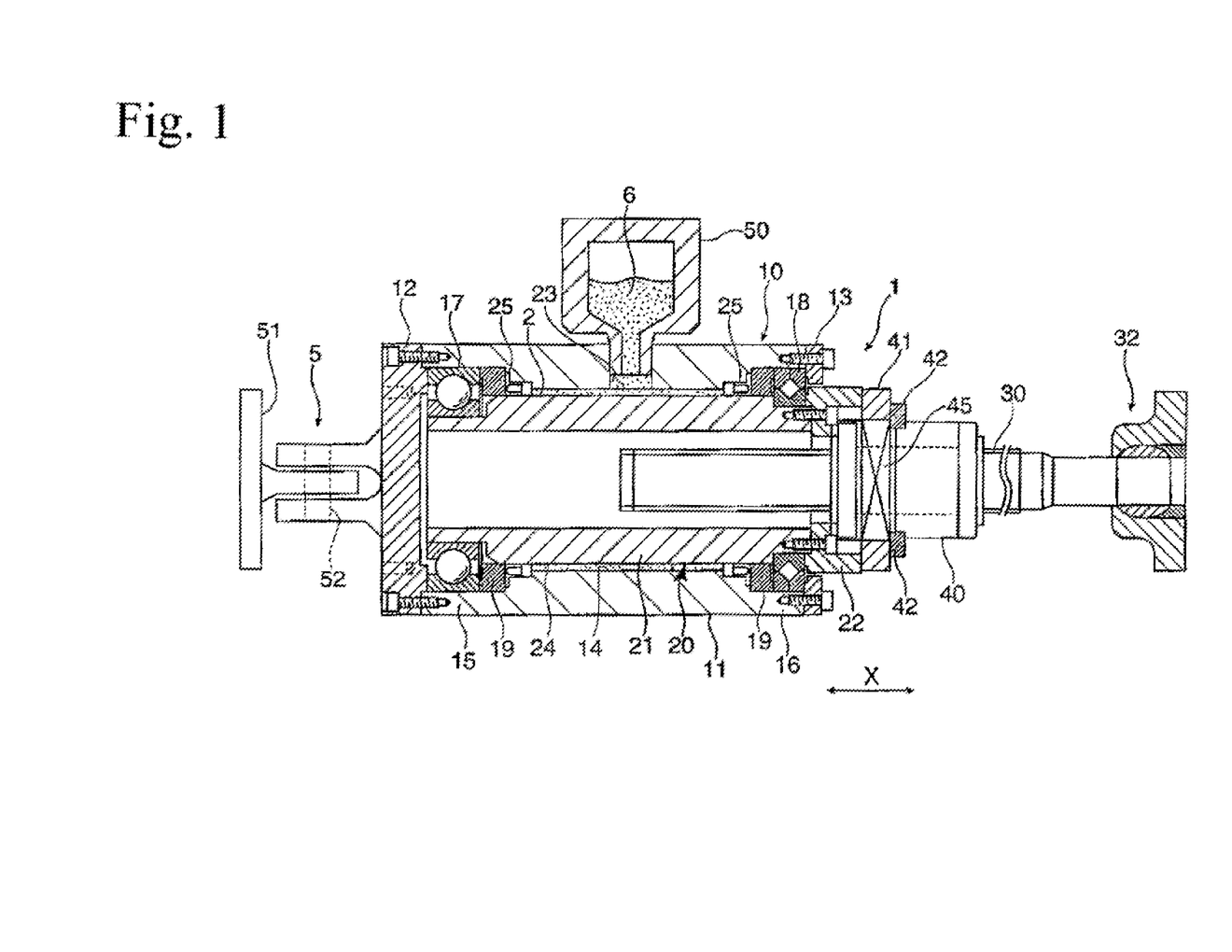
FIG. 1 A front sectional view illustrating an example of a damping apparatus using a screw motion mechanism of the present invention.

FIG. 1 illustrates an example of a damping apparatus including a screw motion mechanism according to an embodiment of the present invention. A damping apparatus 1 is configured to damp vibrational energy through utilization of viscous resistance, and used by being arranged, for example, between a building and a foundation supporting the building or between a pole and a beam of a building.

The damping apparatus 1 includes a fixed outer cylinder 10 formed into a cylindrical shape including a hollow portion, a rotor 20 housed within the hollow portion of the fixed outer cylinder 10 and supported in a rotatable manner with respect to the fixed outer cylinder 10, and a threaded shaft 30 which extends through the fixed outer cylinder 10 and the rotor 20 and is threadedly engaged with the rotor 20. For example, while the threaded shaft 30 includes one end fixed to a foundation 100 as a first structural body, the fixed outer cylinder 10 is fixed to a building as a second structural body.

The fixed outer cylinder 10 includes an outer cylinder body 11 formed into a cylindrical shape, and a pair of end plates 12 and 13 fixed to both end surfaces in an axial direction of the outer cylinder body 11. The outer cylinder body 11 has an inner peripheral surface including a sleeve portion 14 facing an outer peripheral surface of the rotor 20 across a predetermined gap, and a pair of inner cylindrical support portions 15 and 16 provided adjacent to the sleeve portion 14 in the axial direction. A pair of rotary bearings 17 and 18 for supporting rotation of the r rotor 20 is fitted to the pair of inner cylindrical support portions 15 and 16. Those rotary bearings 17 and 18 are fixed respectively to the inner cylindrical support portions 15 and 16 of the outer cylinder body 11 through fixation of the end plates 12 and 13 with bolts to the outer cylinder body 11. Note that, reference symbols 19 in FIG. 1 represent spacer rings for respectively positioning the rotary bearings 17 and 18 in the axial direction by being held in contact with outer races of the rotary bearings 17 and 18.

Meanwhile, the rotor 20 includes a rotary inner cylinder 21 housed within the hollow portion of the fixed outer cylinder 10 and rotated while being supported by the rotary bearings 17 and 18 described above, and a nut member 40 fixed to one end in the axial direction of the rotary inner cylinder 21 through intermediation of a bracket 22. While a gap is formed between the inner peripheral surface of the rotary inner cylinder 21 and an outer peripheral surface of the threaded shaft 30, the nut member 40 is threadedly engaged with the outer peripheral surface of the threaded shaft 30. In other words, the threaded shaft 30 and the nut member 40 serve as a screw motion mechanism for converting a translational motion into a rotational motion.

The rotary inner cylinder 21 includes a journal portion 24 facing the sleeve portion 14 of the outer cylinder body 11. An application chamber 2 for viscous fluid 6 is formed between the sleeve portion 14 of the outer cylinder body 11 and the journal portion 24 of the rotary inner cylinder 21 facing each other. The application chamber 2 is filled with the viscous fluid 6. Ring-shaped sealing members 25 and 25 are fitted respectively to both ends in the axial direction of the journal portion 24 so as to prevent the viscous fluid 6 sealed in the application chamber 2 from leaking out of the application chamber 2. As the viscous fluid 6 sealed in the application chamber 2, for example, a silicone oil having a kinematic viscosity of approximately from 100,000 $mm^2/s$ to 500,000 $mm^2/s$ (25° C.) is used.

Further, the sleeve portion 14 of the outer cylinder body 11 includes a port 23, and a sealed buffer container 50 is connected to the port 23. When the rotor 20 is rotated with respect to the fixed outer cylinder 10, a shear friction force causes the viscous fluid 6 filled into the application chamber 2 to generate heat, and a volume of the viscous fluid 6 increases. The buffer container 50 is provided to absorb such a volumetric change of the viscous fluid 6.

The one end of the threaded shaft 30 connected to the first structural body includes a spherical joint 32 which enables a connection angle of the threaded shaft 30 with respect to the first structural body to be freely adjusted. Detailed description of the spherical joint 32 is made below. Meanwhile, the end plate 12 of the fixed outer cylinder 10 connected to the second structural body includes a clevis 5. The clevis 5 includes flange portions which are projected respectively from both a base portion 51 fixed to the second structural body and the end plate 12, and are coupled to each other by a support shaft 52 extending therethrough. With this, the fixed outer cylinder 10 is freely pivotable about the support shaft 52 with respect to the second structural body.

Figure 2:
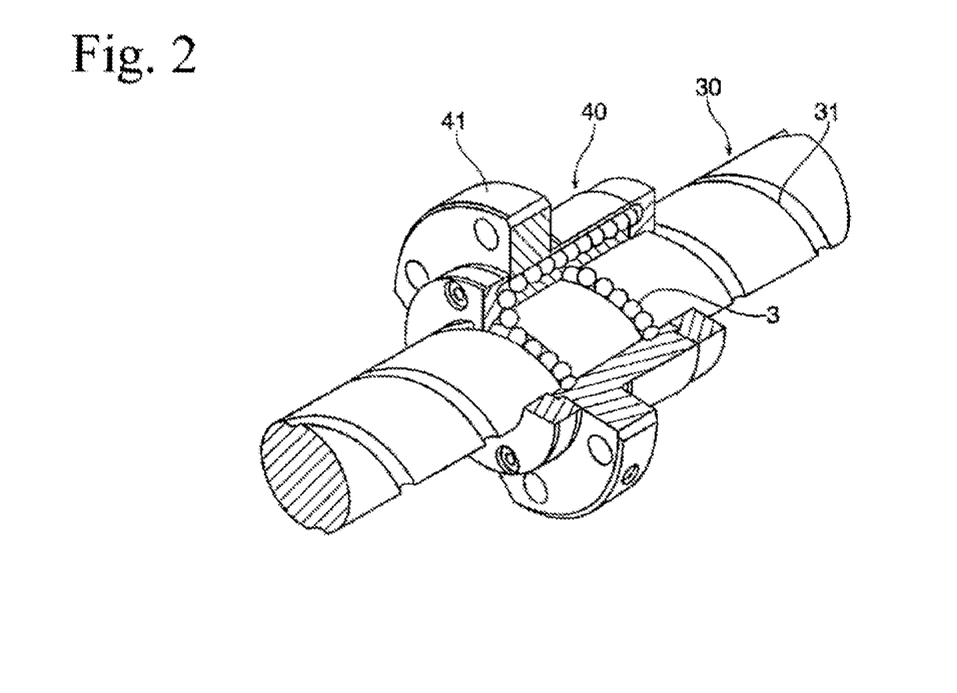
FIG. 2 A perspective view illustrating an example of a combination of a threaded shaft and a nut member.

FIG. 2 is a perspective view illustrating a combination of the threaded shaft 30 and the nut member 40. The outer peripheral surface of the threaded shaft 30 is provided with a helical ball rolling groove 31, and the nut member 40 is threadedly engaged with the threaded shaft 30 through intermediation of a large number of balls 3 which roll in the ball rolling groove 31. Further, the nut member 40 is formed into a cylindrical shape having a through-hole through which the threaded shaft 30 is inserted, and includes an endless circulation path for circulating the balls 3 rolling in the ball rolling groove 31 of the threaded shaft 30. In other words, the nut member 40 and the threaded shaft 30 serve as a screw motion mechanism for converting a translational motion into a rotational motion or the rotational motion into the translational motion.

The nut member 40 has an outer peripheral surface provided with a flange portion 41 through which a fixing bolt 42 is inserted and fastened to the bracket 22. With this, a rotation of the nut member 40 is transmitted to the rotary inner cylinder 21 through intermediation of the bracket 22. The bracket 22 is fastened with bolts to an end surface in the axial direction of the rotary inner cylinder 21, and is projected in the axial direction with respect to the end plate 13 constituting the fixed outer cylinder 10.

Figure 3:
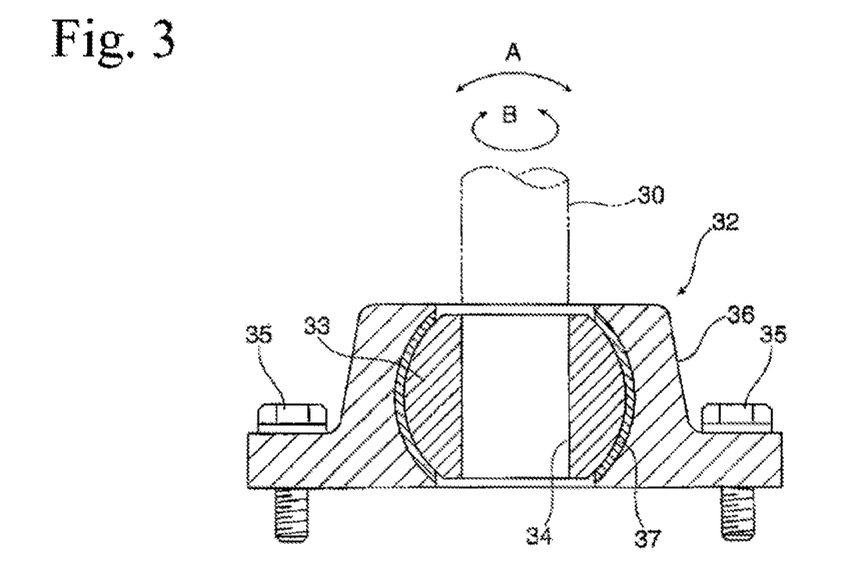
FIG. 3 A front sectional view illustrating a spherical joint provided at an end portion of the threaded shaft according to a first embodiment of the present invention.

FIG. 3 illustrates the spherical joint 32 provided at the one end of the threaded shaft 30 according to the first embodiment.

The spherical joint includes a spherical portion 33 including a through-hole 34 to which the axial end of the threaded shaft 30 is fitted, and a sphere receiving portion 36 which surrounds a spherical surface of the spherical portion 33 and is fastened with fixing bolts 35 to the first structural body. Further, the sphere receiving portion includes a resin liner in contact with the spherical portion, and the resin liner is held in sliding contact with the spherical portion while being fixed to the sphere receiving portion. The spherical surface of the spherical portion 33 is covered with the resin liner 37 at a maximum diameter portion. Thus, the spherical portion 33 cannot be disengaged from the sphere receiving portion 36, and is freely rotated in the sphere receiving portion 36 while the spherical surface thereof is held in sliding contact with the resin liner 37. Therefore, when the axial end of the threaded shaft is connected to the first structural body with the spherical joint, the threaded shaft is freely pivotable about the spherical portion in directions of arrows A with respect to the first structural. body. Further, the threaded shaft can be rotated as indicated by arrows B.

The spherical joint can be produced, for example, by covering the spherical portion with the resin liner, setting the spherical portion and the resin liner into the sphere receiving portion formed through casting or a machining process, and lastly deforming the sphere receiving portion through forging and the like so as to seal the spherical portion and the resin liner inside the sphere receiving portion. Alternatively, the spherical joint may be produced by forming the sphere receiving portion through casting of the spherical portion and the resin liner as a core.

In the damping apparatus configured as described above, when the second structural body vibrates relative to the first structural body along directions of arrows X in FIG. 1, the vibration causes a translational motion in the axial direction of the threaded shaft 30 with respect to the fixed outer cylinder 10. Along with the translational motion, a rotational torque is applied to the nut member 40 threadedly engaged with the threaded shaft 30, and as a counteraction, a reverse rotational torque as high as the rotational torque applied to the nut member is similarly applied to the threaded shaft. The fixed outer cylinder 10 is fixed to the second structural body through intermediation of the clevis 5 described above, and the support shaft 52 of the clevis 5 functions as a rotation stopper for the fixed outer cylinder 10. Thus, when a rotation of the threaded shaft 30 is being stopped, angular acceleration in proportion to the rotational torque is imparted not only to the rotor 20 but also to the nut member 40 as a whole. In this way, the rotor 20 is rotated with respect to the fixed outer cylinder 10.

The solid line graph of FIG. 4 indicates a relationship between an axial external force applied to the threaded shaft 30 (hereinafter referred to as "axial force") and the rotational torque. Unless the threaded shaft 30 and the nut member 40 are displaced relative to each other in the axial direction, the rotational torques are not applied to those members. Thus, under a state in which the axial force is not generated, the rotational torques are not generated as well. Further, as the axial force applied to the threaded shaft 30 becomes greater, the rotational torques applied to the nut member 40 and the threaded shaft 30 become higher.

Figure 4:
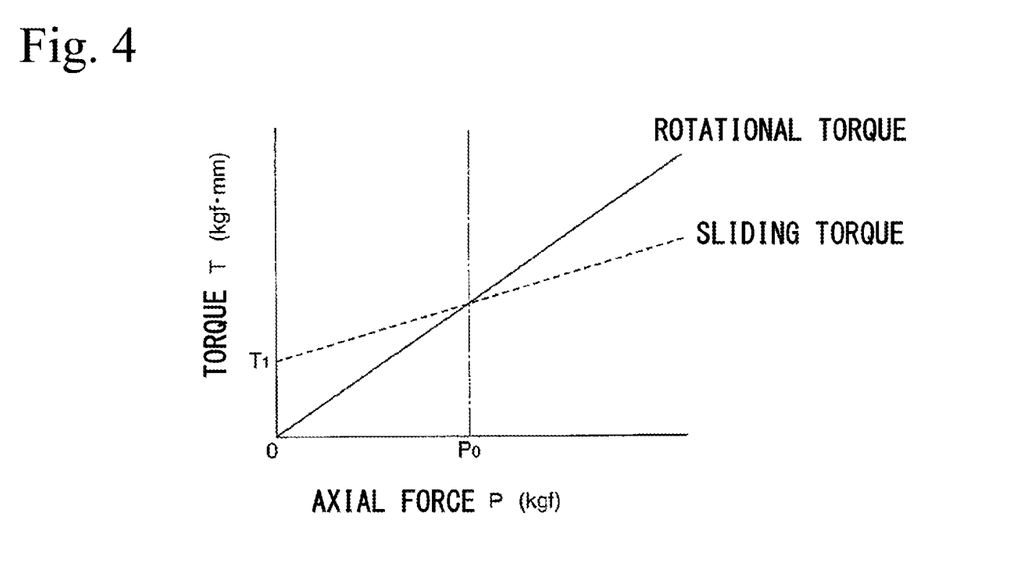
FIG. 4 A graph showing a relationship between an axial force which is applied to the threaded shaft and a rotational torque and a relationship between the axial force which is applied to the threaded shaft and a sliding torque in the spherical joint.

Meanwhile, the broken line graph of FIG. 4 indicates a relationship between the axial force applied to the threaded shaft 30 and a sliding torque in the spherical joint 32. The sliding torque in the spherical joint 32 refers to a torque required for rotating the spherical portion 33 relative to the sphere receiving portion 36. When a torque higher than the sliding torque is applied to the spherical portion 33, the threaded shaft 30 fixed to the spherical portion 33 is, for example, pivoted or rotated with respect to the sphere receiving portion 36. In general, in the spherical joint, the sphere receiving portion 36 slightly fastens the spherical portion 33 in order to close a gap between the sphere receiving portion 36 and the spherical portion 33. Thus, even under a state in which the axial force is not applied from the threaded shaft 30 to the spherical portion 33, as shown in FIG. 4, an initial sliding torque $T_1$ is not equal to 0 kgf·mm. When the axial force is applied from the threaded shaft 30 to the spherical portion 33, a frictional force applied between the spherical portion 33 and the sphere receiving portion 36 increases in proportion to the axial force. Thus, the sliding torque increases along with an increase in axial force.

When the axial force applied to the threaded shaft 30 is gradually increased as described above, the rotational torque applied to the threaded shaft 30 and the sliding torque in the spherical joint 32 also gradually increase in proportion thereto. In a case where an increasing rate of the rotational torque exceeds an increasing rate of the sliding torque, as shown in FIG. 4, when the axial force reaches a boundary axial force $P_0$, the rotational torque and the sliding torque have a reverse relationship in magnitude, in other words, the rotational torque exceeds the sliding torque. When the axial force is smaller than the boundary axial force $P_0$, the sliding torque exceeds the rotational torque. Thus, even when the rotational torque is applied to the threaded shaft 30 as a result of relative translational motions of the nut member 40 and the threaded shaft 30, the rotation of the threaded shaft 30 can be suppressed by the spherical joint 32. In this case, when the nut member 40 is subjected to the translational motion relative to the threaded shaft 30, the rotation of the threaded shaft 30 is prevented by the spherical joint 32. As a result, the nut member 40 is rotated correspondingly to a moving amount of the translational motion.

Meanwhile, when the axial force applied between the threaded shaft 30 and the nut member 40 exceeds the boundary axial force $P_0$, the rotational torque applied to the threaded shaft 30 exceeds the sliding torque in the spherical joint 32. Thus, when the rotational torque is applied to the threaded shaft 30 as a result of the relative translational motions of the nut member 40 and the threaded shaft 30, the rotation of the threaded shaft 30 cannot be suppressed by the spherical joint 32. In other words, in this situation, when the threaded shaft 30 and the nut member 40 are subjected to such translational motions that the axial force exceeds the boundary axial force $P_0$, the threaded shaft 30 is rotated. In other words, the nut member 40 is not rotated correspondingly to the moving amount of the translational motion.

Description is made considering a case where this configuration is applied to the damping apparatus 1 described above. In the case where the second structural body vibrates relative to the first structural body along the directions of the arrows X in FIG. 1, when the axial force applied between the nut member 40 and the threaded shaft 30 is equal to or smaller than the boundary axial force $P_0$, the nut member 40 is rotated without rotating the threaded shaft 30. Thus, the rotary inner cylinder 21 to which the nut member 40 is fixed is rotated with respect to the fixed outer cylinder 10. As a result, the viscous fluid 6 present in the application chamber 2 comes into action to forcibly damp the vibration of the second structural body in the directions of the arrows X with respect to the first structural body.

Further, in the case where the second structural body vibrates relative to the first structural body along the directions of the arrows X in FIG. 1, when the axial force applied between the nut member 40 and the threaded shaft 30 is greater than the boundary axial force $P_0$, the threaded shaft 30 is rotated together with the spherical portion 33 with respect to the sphere receiving portion 36. Thus, even when the rotor 20 which is an assembly of the nut, member 40 and the rotary inner cylinder 21 is moved in the axial direction relative to the threaded shaft 30, the rotor 20 is not rotated correspondingly to an amount of the movement. As a result, the rotation of the rotor 20 with respect to the fixed outer cylinder 10 is suppressed.

Description is made considering an example of a damping apparatus to be used in a vibration control apparatus or a seismic isolation apparatus for a construction. When an unexpectedly massive earthquake occurs, vibration due to excessive acceleration is applied to the damping apparatus. Thus, rotational directions of the rotor 20 are repeatedly reversed while the rotor 20 maintains a high angular momentum. As a result, the damping apparatus may be damaged. Meanwhile, in the damping apparatus 1 described above in this embodiment, when the axial force greater than the boundary axial force $P_0$ is applied between the nut member 40 and the threaded shaft 30, the rotation of the rotor 20 is suppressed. Thus, such damage to the damping apparatus 1 can be prevented.

In other words, in the screw motion mechanism of the present invention and the damping apparatus using the screw motion mechanism, the spherical joint 32 functions as a torque limiter which uses a preset value of a rotational torque corresponding to the boundary axial force $P_0$. Unless the graph of the rotational torque varies, a magnitude of the boundary axial force $P_0$ at an intersection between the graph of the rotational torque and the graph of the sliding torque depends on a magnitude of the initial sliding torque $T_1$ in the graph of the sliding torque and on an increasing rate of the sliding torque with respect to an axial force P. Further, a friction coefficient between the spherical portion 33 and the sphere receiving portion 36 depends on materials for the spherical port ion 33 and the sphere receiving portion 36. Therefore, when the magnitude of the initial sliding torque $T_1$ is changed, the graph of the sliding torque slides up and down in the graph of FIG. 4 while a slope of the graph of the sliding torque remains unchanged. As a result, a value of the boundary axial force $P_0$ can be freely adjusted. For example, with regard to the spherical joint 32 illustrated in FIG. 3, the initial sliding torque $T_1$ can be arbitrarily set through adjustment of a degree of plastic deformation of the sphere receiving portion 36 at the time of the forging process on the sphere receiving portion 36. Alternatively, the initial sliding torque $T_1$ may be arbitrarily set by arbitrarily reducing a fastening force of the sphere receiving portion 36 with respect to the spherical portion 33 through heating of the entire manufactured spherical joint 32 so as to promote deformation of the resin liner 37 interposed between the spherical portion 33 and the sphere receiving portion 36.

Note that, in FIG. 4, when a slope of the solid line graph of the rotational torque is smaller than the slope of the broken line graph of the sliding torque, those graphs do not intersect with each other. Thus, the boundary axial force $P_0$ does not exist, and hence the spherical joint 32 does not function as the torque limiter. Therefore, in the present invention intended so that the spherical joint 32 exert the function of the torque limiter, it is necessary to set the slope of the graph of the rotational torque to be larger than the slope of the graph of the sliding torque. For example, the slope of the graph of the rotational torque is influenced by selection of a lead of the threaded shaft 30 and a rolling friction coefficient of the balls 3, which serve as the screw motion mechanism, and the slope of the graph of the sliding torque depends on the friction coefficient between the spherical portion 33 and the sphere receiving portion 36 and a radius of the spherical portion 33 in the spherical joint 32. Thus, whether or not the spherical joint 32 can be provided with the function of the torque limiter depends on selection of combinations of those factors.

Figure 5:
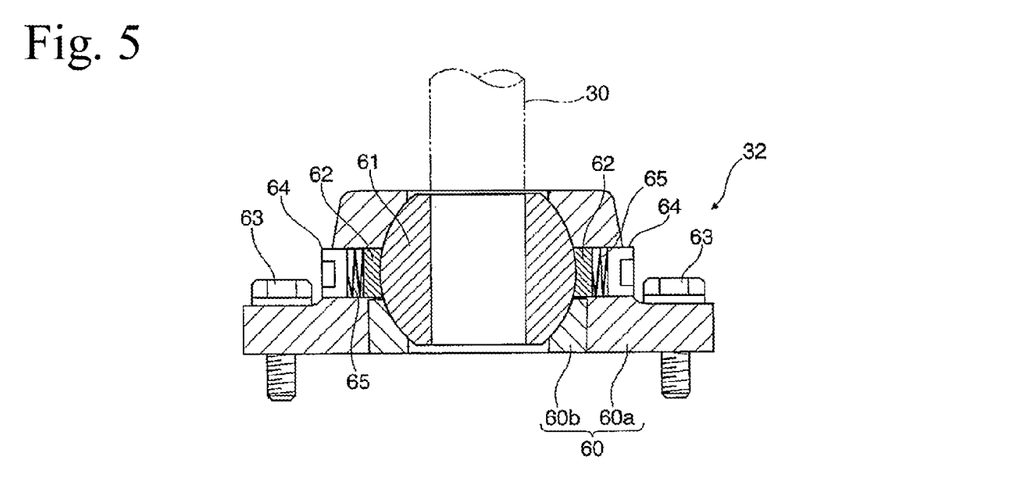
FIG. 5 A front sectional view illustrating a spherical joint provided at the end portion of the threaded shaft according to a second embodiment of the present invention.

Next, FIG. 5 illustrates a spherical joint according to a second embodiment of the present invention.

The spherical joint 32 includes a spherical portion 61, a sphere receiving portion 60 for holding the spherical portion 61, and friction members 62 held in sliding contact with the spherical portion 61 and capable of adjusting a press contact force with respect to the spherical portion 61. Further, the sphere receiving portion 60 includes a receiving portion body 60a and a ring-shaped lid member 60b fastened to the receiving portion body 60a. After the spherical portion 61 is housed in the receiving portion body 60a, the lid member 60b is fastened to the receiving portion body 60a so that the spherical portion 61 is sandwiched between the receiving portion body 60a and the lid member 60b. With this, the spherical portion 61 is closed in the sphere receiving portion 60, and hence cannot be disengaged therefrom. Note that, reference symbols 63 represent fixing bolts for fastening the sphere receiving portion 60 to the first structural body.

The sphere receiving portion 60 is provided with a plurality of through-holes radially around the spherical portion 61, and the through-holes respectively house the friction members 62. Those through-holes are provided perpendicularly to the axial direction of the threaded shaft 30 fixed to the spherical portion 61. Further, adjustment screws 64 are threadedly engaged with the through-holes from an outside in a radial direction of the sphere receiving portion 60, and elastic members 65 such as a spring are arranged between the adjustment screws 64 and the friction members 62. Thus, by changing fastening degrees of the adjustment screws 64 with respect to the through-holes, a pressing force of the elastic members 65 with respect to the friction members 62 is adjusted. In accordance therewith, the press-contact force of the friction members 62 with respect to the spherical portion 61 is adjusted.

In the spherical joint according to the first embodiment, which is illustrated in FIG. 3, the initial sliding torque $T_1$ is set in its production stage. Thus, it is difficult to arbitrarily set the initial sliding torque $T_1$ in accordance with, for example, a use environment of the damping apparatus. Meanwhile, in the spherical joint according to the second embodiment, by changing the fastening degrees of the adjustment screws 64, the press-contact force of the friction members 62 with respect to the spherical portion 61 can be freely changed afterward. In this way, the initial sliding torque $T_1$ of the spherical joint can be arbitrarily changed.

Further, the friction members 62 are held in press-contact with the spherical portion 61 from directions perpendicular to the axial direction of the threaded shaft 30, and hence a frictional force for stopping the rotation of the threaded shaft 30 can be more effectively generated.

Thus, in accordance with the use environment of the damping apparatus, such as an estimated maximum value of vibrational energy to be applied to the damping apparatus, the initial sliding torque $T_1$ of the spherical joint can be arbitrarily set on installation site of the damping apparatus. With this, the value of the boundary axial force $P_0$ corresponding to an upper limit of exertion of a viscous damping effect of the damping apparatus can be arbitrarily changed.

Figure 6:
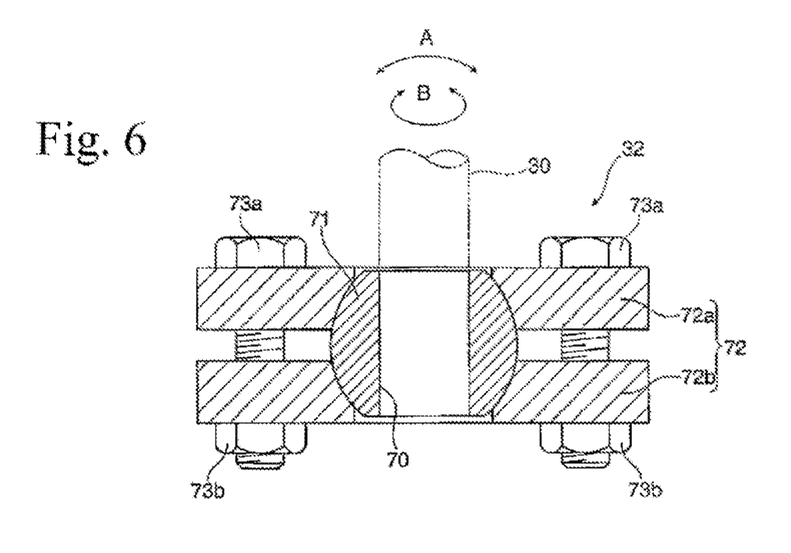
FIG. 6 A front sectional view illustrating a spherical joint provided at the end portion of the threaded shaft according to a third embodiment of the present invention.

FIG. 6 illustrates a spherical joint according to a third embodiment of the present invention.

The spherical joint includes a spherical portion 71 including a through-hole 70 to which the axial end of the threaded shaft 30 is fitted, and a sphere receiving portion 72 for surrounding a spherical surface of the spherical portion 71. Further, the sphere receiving portion 72 includes a first member 72a and a second member 72b. When the first member 72a and the second member 72b are fastened with preload application bolts 73a and nuts 73b, the spherical portion 71 is sandwiched and held between the first member 72a and the second member 72b. The first member 72a and the second member 72b are each provided with a sliding contact surface in conformity with the spherical surface of the spherical portion 71. When the spherical portion 71 is sandwiched between those two members, the spherical portion 71 cannot be disengaged from the sphere receiving portion 72. Further, the threaded shaft 30 is freely pivotable about the spherical portion 71 in the directions of the arrows A with respect to the sphere receiving portion 72, and can be rotated as indicated by the arrows B.

Further, a gap is formed between the first member 72a and the second member 72b so that a fastening force of the sphere receiving portion 72 with respect to the spherical portion 71 can be easily changed by changing fastening degrees of the preload application bolts 73a and the nuts 73b. In other words, by arbitrarily changing the fastening degrees of the preload application bolts 73a, as in the second embodiment described above, the initial sliding torque $T_1$ of the spherical joint 32 can be arbitrarily set in accordance with the use environment of the damping apparatus.

Note that, in the embodiments of the present invention described above, description is made of the screw motion mechanism of the present invention by way of an example of the damping apparatus utilizing the shear friction force to be applied to the viscous fluid. However, an application example of the present invention is not limited thereto. For example, the screw motion mechanism of the present invention is applicable also to a damping apparatus for converting vibrational energy into a rotational motion of a flywheel with the screw motion mechanism of the present invention, to thereby damp the vibrational energy.

Further, the damping apparatus illustrated in FIG. includes the clevis 5 for connecting the fixed outer cylinder 10 to the second structural body. However, the spherical joint 32 described above may be used instead of the clevis 5.

In addition, the structure of the spherical joint is not limited to those described in the first to third embodiments, and the structure of the spherical joint can be freely selected as long as the initial sliding torque $T_1$ is generated and the slope of the graph of the sliding torque is smaller than the slope of the graph of the rotational torque of the screw motion mechanism as described above.

The invention claimed is:

1. A screw motion mechanism, comprising:
   a threaded shaft having an outer peripheral surface provided with a helical thread groove, the threaded shaft having at least one axial end coupled to a first structural body;
   a nut member held in a rotatable manner with respect to a second structural body which is movable in an axial direction of the threaded shaft with respect to the first structural body, the nut member being threadedly engaged with the threaded shaft; and
   a spherical joint for coupling the at least one axial end of the threaded shaft to the first structural body, the spherical joint comprising:
     a spherical portion; and
     a sphere receiving portion for housing the spherical portion,
   wherein the spherical portion and the sphere receiving portion are spaced from the nut member in the axial direction of the threaded shaft,
   wherein a rotational torque transmitted between the nut member and the threaded shaft varies in accordance with an axial force applied to the threaded shaft,
   wherein a sliding torque transmitted between the spherical portion of the spherical joint and the sphere receiving portion of the spherical joint also varies in accordance with the axial force applied to the threaded shaft, and
   wherein, on a graph of torque and axial force of the threaded shaft, a line of the rotational torque intersects with a line of the sliding torque, and the sliding torque exceeds the rotational torque under an initial state in which the axial force is not applied to the threaded shaft.

2. A screw motion mechanism according to claim 1, wherein the sphere receiving portion of the spherical joint comprises a friction member held in press-contact with the spherical portion and capable of adjusting a press-contact force thereof.

3. A screw motion mechanism according to claim 2, wherein the friction member is held in press-contact with the spherical portion from a direction perpendicular to the axial direction.

4. A damping apparatus, comprising:
   a threaded shaft having an outer peripheral surface provided with a helical thread groove, the threaded shaft having at least one axial end coupled to a first structural body;
   a nut member held in a rotatable manner with respect to a second structural body and threadedly engaged with the threaded shaft, the nut member being configured to perform a reciprocating rotation along with vibration of the second structural body with respect to the first structural body;
   damping means coupled to the nut member, for damping the reciprocating rotation of the nut member; and
   a spherical joint for coupling the at least one axial end of the threaded shaft to the first structural body, the spherical joint comprising:
     a spherical portion; and
     a sphere receiving portion for housing the spherical portion,
   wherein the spherical portion and the sphere receiving portion are spaced from the nut member in the axial direction of the threaded shaft,
   wherein a rotational torque transmitted between the nut member and the threaded shaft varies in accordance with an axial force applied to the threaded shaft,
   wherein a sliding torque transmitted between the spherical portion of the spherical joint and the sphere receiving portion of the spherical joint also varies in accordance with the axial force applied to the threaded shaft, and
   wherein, on a graph of torque and axial force of the threaded shaft, a line of the rotational torque intersects with a line of the sliding torque, and the sliding torque exceeds the rotational torque under an initial state in which the axial force is not applied to the threaded shaft.

5. A damping apparatus according to claim 4, wherein the sphere receiving portion of the spherical joint comprises a friction member held in press-contact with the spherical portion and capable of adjusting a press-contact force thereof.

6. A damping apparatus according to claim 5, wherein the friction member is held in press-contact with the spherical portion from a direction perpendicular to the axial direction.

* * * * *